(12) United States Patent
Lehne et al.

(10) Patent No.: US 7,801,228 B2
(45) Date of Patent: Sep. 21, 2010

(54) ANALOG FOURIER TRANSFORM CHANNELIZER AND OFDM RECEIVER

(75) Inventors: Mark Lehne, Blacksburg, VA (US); Sanjay Raman, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 688 days.

(21) Appl. No.: 11/689,816

(22) Filed: Mar. 22, 2007

(65) Prior Publication Data

US 2007/0223607 A1 Sep. 27, 2007

Related U.S. Application Data

(60) Provisional application No. 60/784,468, filed on Mar. 22, 2006.

(51) Int. Cl.
*H04K 1/10* (2006.01)

(52) U.S. Cl. .................. 375/260; 375/340; 375/350; 370/203; 370/206; 370/208; 370/210

(58) Field of Classification Search .................. 375/260, 375/316, 340, 350
See application file for complete search history.

(56) References Cited

U.S. PATENT DOCUMENTS

| | | | |
|---|---|---|---|
| 4,384,291 A * | 5/1983 | Lewis et al. ............ | 342/196 |
| 7,068,593 B2 | 6/2006 | Cho et al. | |
| 7,158,474 B1 | 1/2007 | Gerakoulis | |
| 2002/0145971 A1 | 10/2002 | Cho et al. | |
| 2003/0007450 A1 | 1/2003 | Ohtaki | |
| 2004/0125008 A1* | 7/2004 | Yamaji .................. | 341/155 |
| 2005/0015420 A1* | 1/2005 | Gibb et al. ............. | 708/404 |

* cited by examiner

*Primary Examiner*—David C Payne
*Assistant Examiner*—Leon Flores
(74) *Attorney, Agent, or Firm*—Whitham Curtis Christofferson & Cook, P.C.

(57) ABSTRACT

An OFDM receiver having an analog multiplier based I-Q channelizing filter, samples and holds consecutive analog I-Q samples of an I-Q baseband, the I-Q basebands having OFDM sub-channels. A lattice of analog I-Q multipliers and analog I-Q summers concurrently receives the held analog I-Q samples, performs analog I-Q multiplications and analog I-Q additions to concurrently generate a plurality of analog I-Q output signals, representing an N-point discrete Fourier transform of the held analog samples, the I-Q signals having relative phase and magnitude representing bits in the OFDM sub-channels. The phase and magnitude may represent QPSK. Optionally, a phase shift decoder receives the analog transform I-Q output signals and generates a corresponding binary bit data.

12 Claims, 4 Drawing Sheets

ANALOG FOURIER TRANSFORM CHANNELIZER AND OFDM RECEIVER

CROSS REFERENCE TO RELATED APPLICATIONS

This application claims the benefit of U.S. Provisional Application Ser. No. 60/784,468, filed Mar. 22, 2006, entitled "An Analog/Mixed Signal Orthogonal-Frequency-Division-Multiplexing Analog-to-Digital Converter," the entirety of which is herein incorporated by reference.

TECHNICAL FIELD

The present invention relates to receivers and transmitters of frequency multiplexed signals and, more particularly, to channelizing filters receiving a band of multiple sub-channels and providing multi-channel I-Q signal outputs.

BACKGROUND

Orthogonal Frequency Division Multiplexing (OFDM) is a known method for transmitting digital data, characterized by its sending different bit positions of a serial data stream in parallel, through different sub-channels of a given frequency band. OFDM has advantages over other frequency multiplexing (FDM) schemes, including better spectral efficiency and more robust resistance to channel degradation and narrowband interference.

OFDM has better spectral efficiency because the sub-channels are harmonics of one another, which generally removes the requirement for guard bands between the sub-channels.

OFDM has better resistance to channel degradation and narrowband interference because OFDM transmits different bit positions of the same serial data stream through different frequency bands carrying the sub-channels. Therefore, degradation of just one or two of the sub-channels means that only the bits allocated to those sub-channels are lost. This is significant because, as known in the signal propagation arts, interference and degradation, e.g., from multi-path and from external narrowband sources, is often limited to specific bands. Some FDM schemes, in contrast, may place an entire communication within one band or channel. Channel degradation therefore may result in complete loss of the communication. Further, with OFDM, if error correction is used and the number of sub-channels (i.e., specific bit positions) lost is within the recovery capability of the correction scheme, the original signal may be fully recovered.

Because of such performance advantages, and other advantages such as, for example, ease of sub-channel equalization, OFDM is increasingly seen as a preferred method to transfer digital data.

Various implementations of OFDM systems are known in the art, but most are similar in their general arrangement. A typical OFDM transmitter system receives a serial data stream and partitions the stream into blocks of, for example, M bits. Typically the M bits are encoded as a block of N Quadrature Phase Shift Keying (QPSK) symbols, two bits per symbol, such that N=M/2. QPSK is the most common encoding. Binary phase shift keying (BPSK), encoding one bit per symbol, and X-ary Quadrature Amplitude Modulation (QAM), encoding X bits per symbol, exist but are not generally used—for reasons of practicality and spectral efficiency that are known in the art. Assuming QPSK, there are four possible normalized symbol values, which are (1,1), (−1,1), (−1,−1), (1,−1), representing bit pairs of, for example, (1,1), (0,1), (0,0), (1,0). These representations and mappings of symbol values and bit pairs are only illustrative examples.

As known in the art, each of the N QPSK encoded symbols is transmitted by modulating the respective phases of a respective one of the N different I-Q sub-carriers such that, viewed on an I-Q scatter plot, the phases of that sub-carrier are in one of four quadrants. Typically, all N of the QPSK coded symbols are converted, in parallel, to N corresponding I-Q modulated sub-carriers by inputting the N I-Q symbol values to an N-point Inverse Fast Frequency Transform (IFFT) processor. The N-point IFFT processor outputs N frequency bins, each bin having an in-phase component and a quadrature component. Assuming, for purposes of this disclosure, QPSK, the respective signs of the in-phase and quadrature components are positive or negative, to form the four QPSK states that represent the four two-bit symbols. The N bins output from the N-point IFFT are input to a radio frequency (RF) transmitter that transmits a given band, which will be labeled for reference as "FB", having N sub-channels, each with a QPSK (or other QAM) signal corresponding to one of the N-point IFFT outputs.

The description above is a simplified overview, omitting discussion of, for example, convolution encoding performed on the original serial data stream prior to the BPSK encoding. These are processes are known, and not pertinent to understanding the present invention.

Figure 1:
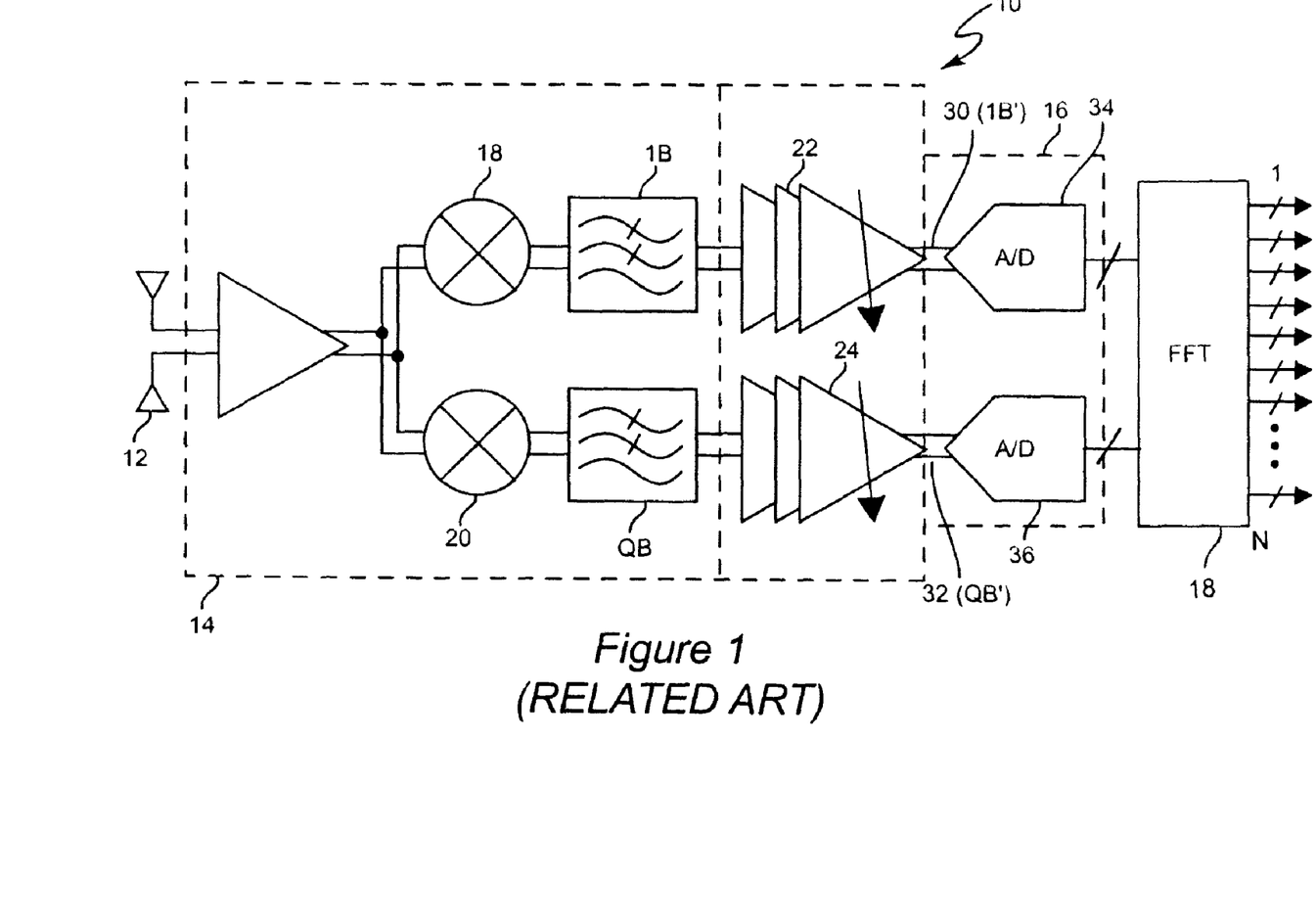
FIG. 1 shows an example prior art digital FFT based OFDM receiver.

A typical OFDM receiver is a reverse of the above-described transmitter, and related art FIG. 1 shows an example functional block illustration of a typical conventional digital OFDM receiver 10. Referring to FIG. 1, the example 10 comprises antenna 12, radio frequency (RF) receiver 14, analog-to-digital converter (ADC) 16, N-point digital FFT processor 18, and OFDM decoder/demultiplexer (not shown). The antenna 12 and RF receiver 14 typically receive a frequency band including the band FB transmitted from a sender (not shown). The band FB includes the plurality of N sub-channels, each having in-phase and quadrature components representing, for example, QPSK (or other QAM) symbols encoding bit position(s) allocated to the sub-channel.

Referring to FIG. 1, the example RF receiver 14 includes an in-phase baseband converter 18 and a quadrature baseband converter 20, which convert the frequency band FB to an in-phase baseband signal IB and a quadrature baseband signal QB, respectively. The converters 18 and 20 typically use respective phases of the same synthesized mixing signal (not shown). As known in the art, the mixing signal may be synthesized to be frequency and time synchronized to the received RF signal.

With continuing reference to FIG. 1, the typical RF receiver 14 includes linear automatic gain control circuits 22 and 24 to controllably amplify the in-phase and quadrature baseband IB and QB, respectively, and output corresponding gain-adjusted signals IB' and QB'.

The FIG. 1 depiction of a typical RF receiver is general; as known to persons skilled in the OFDM and related arts, a typical RF receiver such as item 14 also includes various low pass and bandpass filters (not shown), controllers and circuitry (not shown) for synthesizing the mixing signals feeding the in-phase baseband converter 18 and the quadrature baseband converter 20. These components, and all other design aspects of OFDM front-end RF receivers such as example 14 relating to practicing the present invention are well known to persons skilled in the relevant arts and, therefore, detailed description is omitted.

Referring to FIG. 1, the receiver 14 outputs the gain-adjusted in-phase signal IB' and quadrature signal QB', typically on differential signal lines such as lines 30 and 32, respectively. High speed analog-to-digital converter (ADC) 34 samples the gain-adjusted in-phase baseband signal IB', and high speed ADC 36 samples the gain-adjusted quadrature baseband signal IQ'. The minimum sampling rate of the ADCs 34 and 36, according to the Nyquist Sampling Theorem, must be at least twice the bandwidth of the entire FB band. An example FB bandwidth is approximately 500 MHZ, which requires an ADC sampling rate of at least 1 gigasamples per second (Gs/S).

The required bit resolution of the ADCs 34 and 36 is set by the fidelity requirements, e.g., bit error rate, of the OFDM system. The bit resolution of known implementations of ADCs, particularly the high speed ADCs required to sample the entire FB band also bounds, at least in part, the attainable fidelity or bit error rate of the system. A typical fidelity specification requires an ADC resolution of four to ten bits. The only technology of known, commercially available ADCs that can provide this resolution and sample rate is the technology known in the art as "full flash." As also known in the art, full flash ADCs typically consume considerable power.

With continuing reference to FIG. 1, ADCs 34 and ADC 36 are typically clocked synchronously and output respective pairs of digital samples. The pairs of digital samples are input to the N-point digital FFT processor 18. The mode of input depends on the configuration of the N-point digital FFT processor 18 but, typically, after a succession of N sampled pairs is input the N-point FFT processors performs digital processing and, after a certain delay, outputs N complex valued results, each having a "real" or in-phase data and an "imaginary" or quadrature data. A post-FFT stage (not shown) decodes each of the N complex valued results into, assuming QPSK, one of four possible symbols—based on the relative sign of the in-phase and quadrature components. The symbol translates to a two bit pair that, assuming no error, is the two bit pair that was encoded by the transmitter as described above.

Various kinds, architectures, technologies and implementations of the N-point digital processor 18 are known. An overriding requirement is that the digital processor must generate N-point FFTs fast enough to keep up with the sample rate of the ADCs. Although an FFT is more efficient than a standard DFT, the computational requirement digital calculation of an FFT is high. Further, OFDM FFTs must be calculated successively, one after the other, at a rate high enough to keep up with the ADC sample rate.

The present inventors have therefore identified at least three shortcomings or problems with digital FFT based OFDM receivers.

The first is the fidelity limit imposed by the bit resolution of high speed flash ADCs. Referring to FIG. 1, the ADCs 34 and 36 sample the entire FB band transmitted by the sender, i.e., all N of the QPSK modulated sub-channels. This band may, for example, be approximately 500 MHz wide. This requires an ADC sample rate of 1 Gs/S—minimum. Flash ADCs are therefore required. Flash ADCs, especially having high sampling rates, are currently limited to the six to ten bit range.

Power is the second problem. The power problem is related, in significant part, to the sample rate of the ADCs. Flash ADCs, necessary because the entire band of QPSK modulated sub-channels must be digitized, consume significant power.

Hardware complexity and chip real estate is the third problem. The high throughput requirement for the digital FFT processor requires significant transistor count and complexity. A high clock rate is also required, which adds to the power problem.

SUMMARY OF THE INVENTION

In view of these and other shortcomings of the prior art, one object of the invention is to provide an analog Fourier transformer to receive an analog signal, and channelize the analog signal into N separate I-Q frequency channels, without requiring analog-to-digital conversion of the analog signal, and without requiring digital multipliers or the related controllers, adders and memory required by digital FFT or IFFT processors.

A further object is to provide an OFDM receiver to receive an analog OFDM signal, channelize the signal into N sub-channels, and perform QPSK decoding on the N sub-channels, without requiring analog-to-digital conversion of the analog signal, and without requiring digital multipliers or the related controllers, adders and memory required by digital FFT or IFFT processors.

A further object is to provide an OFDM to receiver to receive an analog OFDM signal and output N separate frequency channels, each channel having an analog in-phase or "I" signal and an analog quadrature or "Q" signal, and perform QPSK decoding on the channels, without requiring analog-to-digital conversion of the analog signal, and without requiring digital multipliers or the related controllers and memory required by digital FFT or IFFT.

According to one exemplary aspect, an analog multiplier based Fourier transformer is formed of in-phase and quadrature signal paths connecting a plurality of analog multipliers and adders, constructed and arranged to perform complex, or "I-Q" addition and complex or "I-Q" multiplication of analog signals on the in-phase and quadrature signal paths, without digitizing the analog signal.

According to one exemplary aspect, an analog multiplier based Fourier transformer is formed of in-phase and quadrature signal paths connecting a plurality of analog multipliers and adders, constructed and arranged to perform I-Q addition and I-Q multiplication of analog signals on the in-phase and quadrature signal paths, the analog multipliers and adders constructed and arranged according to a radix-R Fast Fourier Transform signal path.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF EXEMPLARY EMBODIMENTS

The following detailed description of the invention is in reference to accompanying drawings, which form a part of this description. The description is of illustrative examples of various embodiments in which the invention may be practiced. The invention is not limited to the specific illustrative examples. Other configurations and arrangements embodying or practicing the present invention can be readily implemented by persons skilled in the arts, upon reading this description.

In the drawings, like numerals appearing in different drawings, either of the same or different embodiments of the invention, reference functional or system blocks that are, or may be, identical or substantially identical between the different drawings.

Various embodiments of the invention, although different, are not necessarily mutually exclusive. For example, a particular feature, function, act or characteristic described in one embodiment may, within the scope of the invention, be included in other embodiments.

Various instances of the phrase "in one embodiment" do not necessarily refer to the same embodiment.

Unless otherwise stated or made clear from its context, the terminology and labeling used herein is not limiting and, instead, is only for purposes of internal consistency in referencing the examples.

The present invention provides a novel frequency channelizer that, according to the described arrangements of analog multipliers and adder, performs complex-valued arithmetic transformation of an input signal, operating on the signals in analog form, as opposed to digital processors that operate on binary representations of the signal. One aspect of the invention provides transformation from a time domain to a frequency domain. One aspect provides transformation from the frequency domain to the time domain.

One example embodiment provides a frequency channelizer as a novel, analog multiplier based N-point Fast Fourier Transform (FFT) unit, referenced hereinafter as the "AMS FFT". The AMS FFT forms performs "butterfly" operations, including complex-valued multiplications and additions, with a novel arrangement of analog I-Q multipliers and analog I-Q adders, instead of the digital multipliers and adders that implement conventional FFT processors.

The AMS FFT propagates analog signals as I-Q signals, having an in-phase "I" component signal and a quadrature "Q" component signal, with respective magnitudes and polarities representing an I-Q magnitude and phase angle. The analog I-Q multipliers are effectively phase rotation circuits. Each analog I-Q multiplier is configured to receiving an operand analog I-Q complex signal and to output an I-Q signal that is the input signal rotated by a particular phase angle.

The phase angle rotations of the I-Q analog signal effected by the I-Q multipliers is the same phase angle effected by the digital "twiddle factors" used in digital multiplications in digital FFT processors. The phase rotation angle may be zero or 180 degrees, which may be effected by, for example, a pair of unity gain amplifiers, one for the in-phase analog operand (inverted for 180 degrees) and one for the quadrature analog operand. The phase rotation may be 90 degrees, which may be effected by wires and inverting amplifiers. All other phase rotations associated with twiddle factors are realizable, by a straightforward arrangement of sum and difference amplifiers, and inverting and non-inverting gain/attenuation amplifiers.

An aspect of one example AMS FFT includes a pipeline arrangement of $\text{Log}_R (N)$ banks of novel analog radix R butterfly units, each generically referenced hereinafter as "ABU". One example ABU according to the invention is constructed and arranged as a radix-2 architecture. Radix 2 is only one example, as other radices are contemplated. According to one aspect, for example, a radix 4 ABU may be implemented as four radix 2 ABUs.

One example embodiment of the invention includes an N-point AMS FFT having N signal inputs and N transformation outputs. The N transformation outputs are each complex-valued, having a real, or in-phase output and an imaginary, or quadrature output. The N signal inputs may each be a paired arrangement of an in-phase input sample terminal and a quadrature input sample terminal.

According to one aspect, a sequence of N analog signal samples, from N sample-and hold circuits, are input in a parallel manner, to the N signal sample inputs of the AMS FFT. The N signal samples may represent a sequence of N analog samples, obtained by a time sequential sampling of an external signal.

Further to one aspect, after a propagation time through the lattice of analog I-Q multipliers and analog I-Q adders of the particular implementation of the AMS FFT, the AMS FFT outputs on its N transformation outputs an N discrete point Fourier Transform of the N samples.

According to one aspect, after a first set of N parallel analog samples is input to the AMS FFT, and the corresponding N discrete point Fourier Transform of the N signal samples is output, a new set of N signal samples is input to the N signal sample input terminals of the AMS FFT. Then, after the propagation time through the analog multiplier and adders of the AMS FFT, the N output terminals of the AMS FFT generate the N discrete point Fourier Transform of the new set of N signal samples.

An example implementation according to one embodiment includes an analog sampling unit preceding the AMS FFT, the analog sampling unit having a signal input terminal and N sample output ports. One example analog sampling unit may receive and sample a baseband in-phase band and baseband quadrature band, spanning N sub-channels of an OFDM signal. According to one aspect, the sample outputs of the analog sampling unit connect to the N signal inputs of the AMS FTT.

Illustrative Specific Exemplary Embodiments

Figure 2:
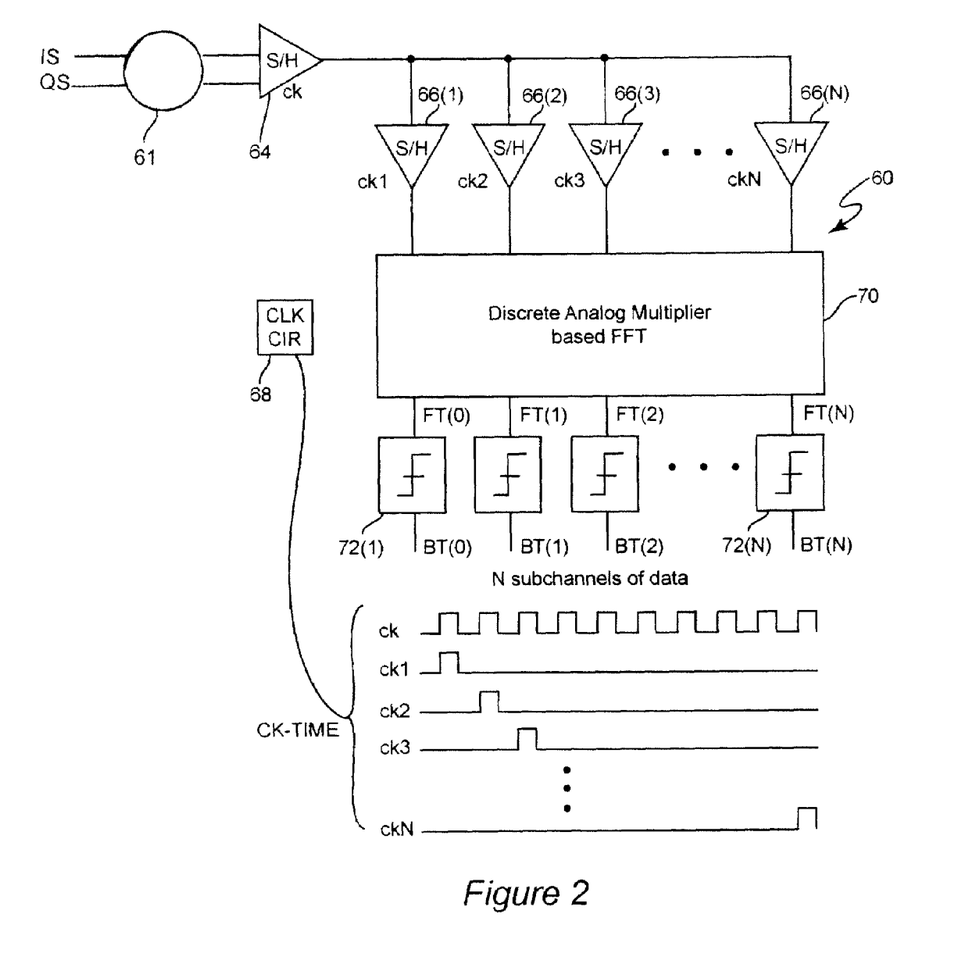
FIG. 2 is a functional block diagram showing one example OFDM receiver having one or more embodiments of the present invention.

FIG. 2 shows a functional block diagram of an illustrative example OFDM receiver 60 embodying features and exemplary aspects of the present invention. The description of the FIG. 2 example enables a person of ordinary skill in the relevant arts to make and use embodiments of the invention. The person of ordinary skill is assumed to have knowledge of operational amplifiers, sample-and-hold circuits, analog comparators, analog circuit design methods, particularly at OFDM transmission frequencies and OFDM baseband bandwidths, OFDM coding, OFDM signal transmission, reception, decoding, and synchronization methods.

Referring to FIG. 2, example OFDM receiver 60 receives an in-phase baseband signal IS and a quadrature baseband signal QS, from an RF-to-baseband converter (not shown). The RF-to-baseband converter that outputs bands IS and QS may, for example, be in accordance with known OFDM front end RF receivers such as, for example, the converter 14 of related art FIG. 1. The basebands IS and QS are therefore in accordance with IB' and QB', respectively, as described in reference to FIG. 1. The basebands IS and QS connect to a buffer amplifier 61, which connects to the input of a first sample-and-hold (S/H) circuit 64. The buffer amplifier 61 is optional, but preferred, in accordance with standard sample-and-hold design practice. S/H 64 includes a pair of S/H circuits (not separately labeled), one receiving the in-phase baseband IS and one receiving the quadrature baseband QS.

The output of the S/H 64 connects to the input of each of a bank of N sample units 66, labeled individually as 66(*n*), n=1 to N.

Referring to FIG. 2, clock circuit 68 generates a master clock ck and N phase-shifted, divide-by-N clocks, labeled ckn, n=1 to N, having a timing such shown by CK_TIME of FIG. 2. Each of the clocks ck connects to a corresponding one of the S/H units 66. Referring to FIG. 2, clock ck1 connects to S/H 66(1), ck2 connects to S/H 66(2) and ckN connects to S/H 66(N). It is assumed, for this example, that the S/H circuit 64 is triggered to a "hold" mode by the rising edge of clock ck, and the S/H units 66 are triggered to a "hold" mode by the falling edge of their respective clocks ck.

The first S/H circuit samples the IS and QS basebands at the master sample rate ck. The sample rate ck is at least twice the bandwidth IS and QS. The S/H 64 consumes very little power, though. It is a pair of single sample and hold circuits (one for sampling IS, and one for sampling QS), having a small fraction of the fast switching transistors and charging capacitors required for a flash ADC. Each S/H 66 includes a pair of S/H circuits (not separately labeled), one receiving the sampled in-phase baseband IS and one receiving the sampled quadrature baseband QS from the S/H 64.

Referring to FIG. 2, at the timing diagram CK_TIME, the S/H units 66 are respectively clocked by the falling edge of ck1, ck2, ... ckN to sample the output of S/H 64, one after the other. After clock ckN clocks S/H 66(N), the bank of S/H units 66 hold N consecutive samples of the IS, QS basebands received from the first S/H 64. These N consecutive time samples are IN(1) through IN(N) shown as connecting to the AMS FFT 70.

The S/H circuit 64, bank of S/H circuit circuits 66, and clock circuit 68 may be constructed with standard, known circuit design methods and technologies. As understood by a person or skill in the art, relevant parameters of the S/H units 64 and 66 are input impedance, output impedance, slew rate, droop rate, and sampling jitter. Relevant parameters of the clock circuit 66 are frequency stability and jitter. As also understood by a person or skill in the art, upon reading this disclosure, the values and ranges of these parameters are dictated the bandwidth of IS and QS, and the target bit error rate or other measure of system fidelity, and are readily identified with circuit simulation software and other standard design methods. Table I below provides, as an illustrative example, one specific set of such parameters, used by the inventors for computer model simulation. These were based on an IS and QS bandwidth of approximately 500 MHz. The Table I values are only for purposes of illustrative example.

TABLE I

|  | Input Buffer Amp | S/H 64 | S/H 66 | Multiplier Op Amps (for analog I-Q multipliers 124) |
|---|---|---|---|---|
| Bandwidth | 700 MHz | 800 MHz | 800 MHz | 800 MHz |
| Slew Rate | 5 V/nsec | 5 V/ns | 2 V/ns | 2 V/ns |
| Input Capacitance | N/A | 20 fF | 20 fF | 20 fF |
| Output Impedance | 1 kΩ | 10 kΩ | 10 kΩ | 10 kΩ |

Referring to FIG. 2, the example AMF FFT unit 70 is an analog circuit comprising an arrangement of analog I-Q multipliers and analog I-Q adders, interconnected and configured such that, after a respective propagation delay, the AMS FFT outputs on its N outputs, labeled FT(n), n=0 to N, analog signal values corresponding to the discrete N-point Fourier Transform of the N inputs IN(n), n=1 to N.

Figure 3:
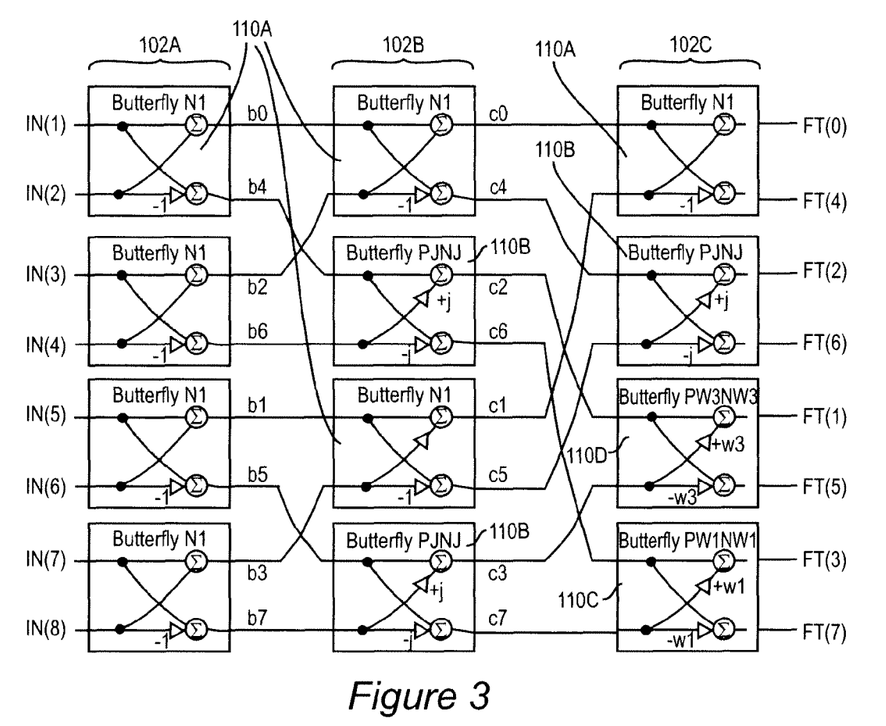
FIG. 3 is an illustrative high-level circuit diagram of one example inventive analog multiplier based FFT circuit having one or more embodiments of the present invention.

FIG. 3 shows an example circuit block diagram of an illustrative 8-point radix-2 AMS FFT 100 having embodiments of the present invention. For an example of N=8, an embodiment according to the FIG. 3 example 8-point AMS FFT 100 may implement the AMS FFT 70 of FIG. 2.

Referring to FIG. 3, the illustrative example 8-point radix-2 AMS FFT 100 is formed of a lattice of twelve radix-2 AMS butterfly circuits, of configurations 110A, 110B, 110C, and 110D, generically referenced as 110, arranged in a three-stage pipeline, with stages labeled 102A, 102B ands 102C, with four circuits 110 to each stage. The inputs to the example 8-point radix-2 AMS FFT 100 are IN(n), n=1 to 8 (equivalent to an index range of 0 to 7), the outputs are FT(n), n=0 to 7, bit reversed outputs of the first bank 102A are labeled b0 through b7, and the hit reversed outputs of the second stage 102B are labeled c0 through cN. As shown in FIG. 3, each radix-2 AMS butterfly circuit 110 is composed of two analog I-Q multipliers and analog I-Q summers. Referring to FIG. 3, in the radix-2 butterfly circuits 110 where the analog I-Q multiplier is configured as a "+1" multiplier, the multiplier is represented as a simple line. The line is only a functional representation, as the "+1" multiply may be a wire, a unity gain amplifier or an attenuating amplifier (to avoid an overly large signal saturating subsequent analog stages).

With continuing reference to FIG. 3, the signal flow of the illustrative example 100 corresponds, in topology, to the digital data flow through a digital radix-2 decimation-in-time eight-point FFT process. The example AMS FFT 100, though, realizes and performs an eight discrete point Fourier transform, with a novel lattice arrangement of analog I-Q multipliers and summers, providing a multi-stage straight-through analog signal flow, without digital multipliers, digital adders, or significant clocked logic. The AMS FFT 100 therefore performs the eight discrete point Fourier transform without requiring an ADC sampling of the IS and IQ baseband signals.

Referring to FIG. 3, the signal lines connecting the analog summers and analog multipliers (not separately labeled) in the lattice are each two lines (not shown), one of the two lines carrying an in-phase component and the other line carrying a quadrature component of an analog signal. In turn, each of the in-phase and quadrature lines (not shown) is preferably implemented as a two-line differential pair, in accordance with conventional RF analog circuit design standards.

Figure 4:
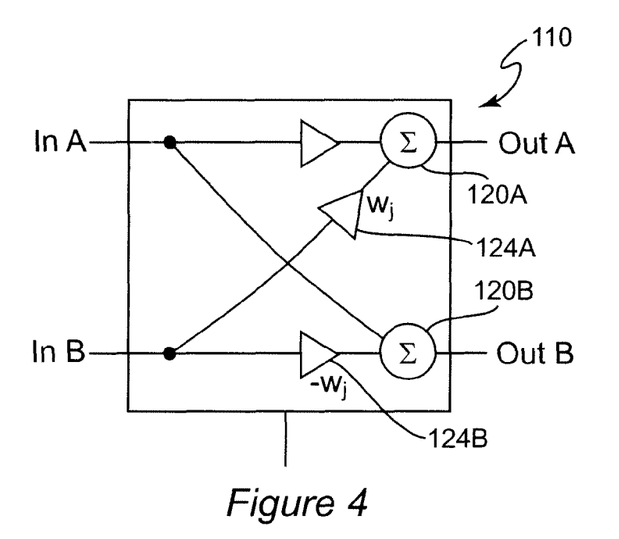
FIG. 4 is an illustrative circuit diagram of one example of an inventive analog multiplier based butterfly circuit from FIG. 3.

FIG. 4 shows an enlarged, detailed circuit flow diagram of an example radix-2 AMS butterfly circuit 110 of the FIG. 3 example embodiment. The circuit 110 comprises analog I-Q summer 120A, analog I-Q summer 120B, generically referenced as 120, and analog I-Q multiplier 124A and analog I-Q multiplier 124B, generically referenced as 124.

Each of the analog I-Q summers 120 receives two I-Q analog input signals, i.e., an in-phase signal and a quadrature signal, and outputs an I-Q analog output having an in-phase component equal to the sum of the respective in-phase components of the inputs, and a quadrature component equal to the sum of the respective quadrature components of the inputs. Each of the in-phase and quadrature signals has a magnitude and a polarity, positive or negative, upon which the summations are generated. Circuits implementing this summation function are readily implemented with standard analog circuit design methods and technologies.

In the example radix-2, 16-discrete point Fourier transform of FIG. 3, each I-Q analog multiplier (item 124 of FIG. 4, not separately labeled in FIG. 3) is configured perform one of the following five I-Q multiplications on the I-Q analog input: +1, −1, +j, $w^1$, and $w^3$, which correspond to the "twiddle factors" of a digital 16-point radix 2 DIT FFT. Like "twiddle factors", the I-Q multiplier value applied by the I-Q multipliers 120 represent phase rotations of the I-Q analog operand, if viewed in an I-Q plane representation. The multipliers of +1, −1, +j, $w^1$, and $w^3$ represent a phase rotation of 0 degrees, 180 degrees, 90 degrees, 45 degrees, and 135 degrees, respectively. The analog I-Q multipliers 124 are therefore each configured to perform this phase rotation. All of the phase rotations other $w^1$ and $w^3$ are unity pass, inverting unity pass, or simple interchanging of the I and Q signals. Implementation of I-Q analog multipliers 120 that multiply by $w^1$ and $w^3$, i.e., that rotate the operand I-Q analog signal by 45 degrees or 135 degrees, respectively, also straightforward as, for example, the implementations described in further detail below.

In the radix-2, 16-discrete point Fourier transform of FIG. 3, there are four different configurations of the butterfly 110, each having respective configurations of its I-Q analog multipliers 124 (+1, −1, +j, $w^1$ and $w^3$), which are labeled as 110A, 110B, 110C and 110D. The configuration (i.e., whether 110A, 110B, 110C or 110D) is set according to location of the butterfly 110 in the FIG. 3 lattice.

Referring to FIG. 4, analog I-Q multiplier 124 with a configuration of +1 simply passes the in-phase and the quadrature components. With a configuration of −1 the analog I-Q multiplier 124 inverts the polarity of both the in-phase and the quadrature component. This effects a 180-degree rotation of the operand analog I-Q signal input to the multiplier. This is a straightforward function, readily implemented with standard analog circuit design methods and technologies.

Analog I-Q multiplier 124 with a configuration +j outputs an in-phase analog signal having the magnitude of its quadrature input, with a reversed polarity, and outputs a quadrature signal having the magnitude of the in-phase component, with the same polarity. In other words, the analog I-Q input signal is phase rotated by 90 degrees. This is a straightforward function implemented, for example, by simple wiring.

Analog I-Q multiplier 124 with a configuration of $w^1$ outputs an in-phase signal having a magnitude and polarity equal to the quadrature input signal subtracted from the in-phase input signal, multiplied by the inverse of the square root of 2, and outputs a quadrature signal equal to the sum of the in-phase and quadrature input components, also multiplied by the inverse of the square root of 2. This effects a 45-degree rotation of the operand analog I-Q signal input to the multiplier. This is a straightforward function, readily implemented with standard analog circuit design methods and technologies. For example, the multiplications are readily achieved by setting an appropriate gain, namely a gain equal or proportional to the inverse of the square root of 2, on the operational amplifier(s) (not separately shown). This gain may be set at time of manufacture, and may be non-adjustable. Alternatively, the gain may be adjustable. For example, referring to FIG. 4, an example AMS butterfly circuit 110 may be implemented with a bias input, such as the example "Wj" bias input labeled as 126. The input may be a single line, or may be two—one for the multiplier 124A and one for the multiplier 124B. Various implementations of a source (not shown) supplying a bias Wj to adjust the multipliers 124 to effect the $w^1$ multiplier (i.e., the 45 degree I-Q phase rotation) are contemplated. For example, a digital-to-analog converter (DAC) (not shown) may generate the bias Wj according to a digital bias datum (not shown) having, for example, eight bits. Further, a low speed, simple digital processor (not shown) may load or output the digital bias datum to the DACs.

Analog I-Q multiplier 124 with a configuration of $w^3$ outputs an in-phase signal equal to the sum of the in-phase and quadrature inputs, multiplied by the inverse of the square root of 2, with a reversed polarity, and outputs a quadrature signal having a magnitude equal to the quadrature input component subtracted from the in-phase input component magnitude, multiplied by the inverse of the square root of 2. Like the $w^1$ configuration, this is readily implemented with standard analog circuit design methods and technologies.

It will be understood that magnitudes of "equal to" and "multiplied by the inverse of the square root of 2" are relative terms, as both values may be attenuated, or amplified, relative to the inputs to the analog I-Q multipliers 124. Further, as a person of ordinary skill in the art will understand upon reading this disclosure, the analog I-Q multipliers 124 and the analog I-Q adders 120 may include a gain, or attenuation, set according to the stage (e.g., stage 102A, 102B and 102C of FIG. 3) in which the butterfly circuit 110 is located. Attenuation may be used to compensate magnitude increases from successive summations, which may saturate subsequent analog components in the lattice. The attenuation may, if used, me fixed at time of manufacture. Alternatively, an adjustable attenuation may be used, similar to the "Wj" multiplier gain described in reference to I-Q multipliers for $w^1$ and $w^3$.

Depending on the specific application, it may be desired to equalize the propagation paths through the lattice of analog I-Q multipliers and analog I-Q summers through the AMS FFT 100. For example, referring to FIG. 3, the depicted circuit diagram indicates the path to FT(0) as a summation of all of the IN samples, without passing through any of the analog I-Q multipliers. Other outputs FT result from different successions of analog I-Q multipliers. Regardless of implementation, some analog multipliers (even unity gain amplifiers) will have some error, however small. The inventors' parameterized model simulations, described below, account for such error. For N sizes not greater than, for example, N=128, analog I-Q multiplier based Fourier transform units according to the invention may be readily implemented that have cumulative errors well within limits required of related art digital FFT based OFDM receivers. It is contemplated, though, that there may be applications in which a particular consistency of error among different FT outputs may be desired. Such consistency is readily achieved by inserting, for example, unity gain amplifiers in select signal paths, as easily determined by standard simulation techniques.

It will be understood that the example AMS FFT 100 of FIG. 3 is only one illustration of one embodiment of the AMS FFT 70 of FIG. 2. Various alternative implementations and embodiments will be apparent to persons of ordinary skill in the art. For example, the FIG. 2 OFDM receiver 60 may implement a 16-channel, 32-channel or 64-channel OFDM receiver, in which N=16, 32 and 64, respectively. To implement N=16, a variation of the FIG. 3 AMS FFT 100 may be a radix-2 16 point discrete Fourier transform circuit, comprising four stages of banks of minor variations of the radix-2 AMS butterfly 110 circuits of FIG. 4, with eight circuits 110 per bank. The minor variation to the circuits 110, readily implemented by persons skilled in the art upon reading this disclosure, is to the gain (i.e. rotation) of the analog I-Q multipliers 124 and 126. Another example implementation of the AMS FFT 70 of FIG. 2, with N=16, may be use a radix-4 alternative (not shown) to the radix-2 AMS butterfly 110. The radix four alternative is easily constructed based upon reading this disclosure, by arranging analog I-Q multipliers such as, for example, circuits 124, and analog I-Q summers such as, for example, circuits 120, in a radix-4 arrangement, with gains and interconnects providing an analog I-Q implementation, according to the invention, of a corresponding digital radix-4 butterfly.

Other alternative implementations and embodiments are readily apparent. For one variation of the AMS FFT 70 is a decimation-in-frequency (DIF) arrangement, easy constructed by minor modification of the FIG. 3 arrangement and the radix-2 AMS butterfly circuits 110.

The present invention does not contemplate any theoretical limit on the "size" of the discrete-point Fourier transform that it may provide, using I-Q analog multipliers and I-Q analog adders. Depending on the particular implementation technology, though, an N greater than, for example, N=128, may require particular attention to the precision requirement of the "twiddle factors," and to the accumulated error through successive analog I-Q multipliers and summers.

Referring to the FIG. 2 example OFDM receiver 60, one example optional feature is to insert a time domain window function (not shown), such as a Hamming window. One example implementation is to insert an analog amplifier (not shown) in each of the N paths connecting the IN(n) outputs of the S/H unit 64 to the AMS FFT unit 70, setting each amplifier's gain according to its corresponding position in the Hamming window. Other implementations are apparent to persons of skill in the relevant arts upon reading this disclosure.

With continuing reference to FIG. 2, after the set of inputs IN to the AMS FFT unit 70 propagate through the lattice analog I-Q summers and analog I-Q multipliers arranged as, for example, the AMS FFT 100 of FIG. 3, the N different FT(n) outputs of the AMS FFT unit 70 are signals having magnitude and polarity representing the N discrete point Fourier transforms of IN(n).

Valid FT output values are generated each time the N S/H units 64 sample another N samples of the in-phase and quadrate bands IS and QS, inputted as IN to the AMS FFT 70. Each FT(n) line therefore outputs an $n^{th}$ QPSK symbol stream, as magnitude and polarity of the in-phase and quadrature component of each of the FT outputs. The FT(n) signals are input to a bank of BPSK comparator/decoders 72, which output N bit streams, collectively labeled as BT. The BPSK comparator/decoder 72 may generate one or two bits per symbol, depending on the particular requirements of the systems' Viterbi decoder (not shown).

Referring to FIG. 3, the FT(n) outputs, at least diagrammatically, in a bit-reversed order. The order is only diagrammatical though, as the physical order of the FT(n) outputs is a design choice.

Referring to FIG. 2, the bit streams BT may be digitized and processed by processing means (not shown) to perform, post OFDM reception/BPSK bit recovery, various digital communication functions. The required clock rates and processing power of such digital processing means is, however, typically much lower than the clock rates and processing power required for the digital FFT-based OFDM decoding of the related art.

The present inventors have identified significant savings in power and hardware overhead that may be obtained with the present invention, as compared to relevant art FFT-based OFDM receiver/decoders. A very significant savings is obtained by its removal of the high speed flash ADC. Based on simulations, the bank of sample and hold circuits preceding the AMS FFT, such as the S/H units 64 shown in FIG. 2, consumes less than one fourth the power of equivalent function flash ADCs. Further, the present inventors have designed, and thoroughly simulated, a single chip CMOS AMS FFT integrated circuit chip (IC) embodying the present invention. Simulation of the AMS FFT IC shows very satisfactory performance, and significant die surface reduction as compared to comparable performance digital FFT based OFDM receivers.

FIG. 2 is only one example embodiment. Various other devices and systems embodying the invention will become apparent to persons skilled in the relevant arts upon reading this disclosure. Example applications include replacing or supplementing various digital channelizers such as, for example, digital FFT channelizers currently used or that may be developed for other frequency multiplexing schemes. OFDM transmission or transceiver systems may embody the present invention. FIG. 2 describes one example AMS FFT unit 70, configured to perform a forward Fourier Transform. Conventional OFDM transmitters and transceivers encode OFDM using an inverse FFT (IFFT). Upon reading this disclosure, persons of ordinary skill in the art can readily implement an analog multiplier based discrete IFFT unit by, for example, minor modifications to the example AMS FFT 100 shown in FIGS. 3 and 4.

Computer Simulations of Parameterized Models

A single chip CMOS AMS FFT IC embodying the present invention has been designed, modeled using a parameterized model, and verified by simulation as being ready-to-build and fully functional. The parameterized simulation model incorporated and accounted for all reasonably identifiable physical characteristics of a CMOS IC built according to the CMOS AMS FFT model, based on current, proven IC circuit technologies, applying standard and accepted circuit design practices. The parameterized simulation model included, for each of the represented components, bandwidth, slew rate, voltage swing, output impedance and loading capacitance. The parameterized simulation model was particularly designed and operated to identify cumulative effects of RC roll-offs and slew rate limitations, to ensure a physically constructed implementation would meet desired performance requirements.

Figure 5:
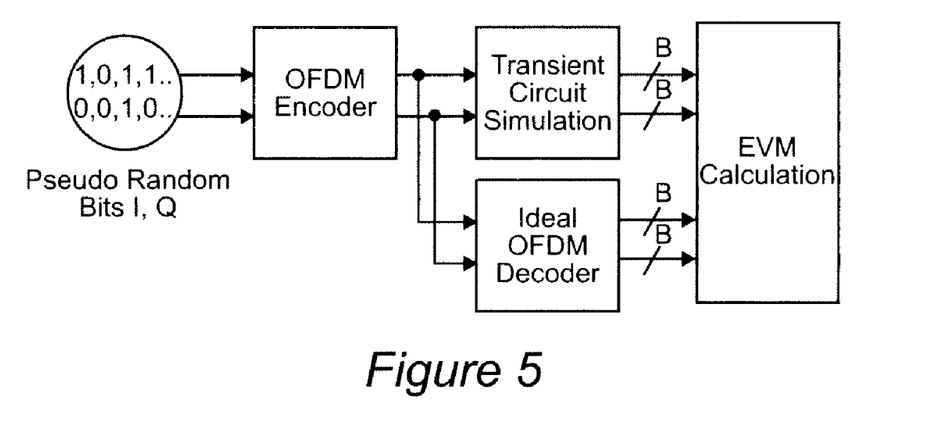
FIG. 5 shows an example block flow diagram of one example simulation.
Figure 6:
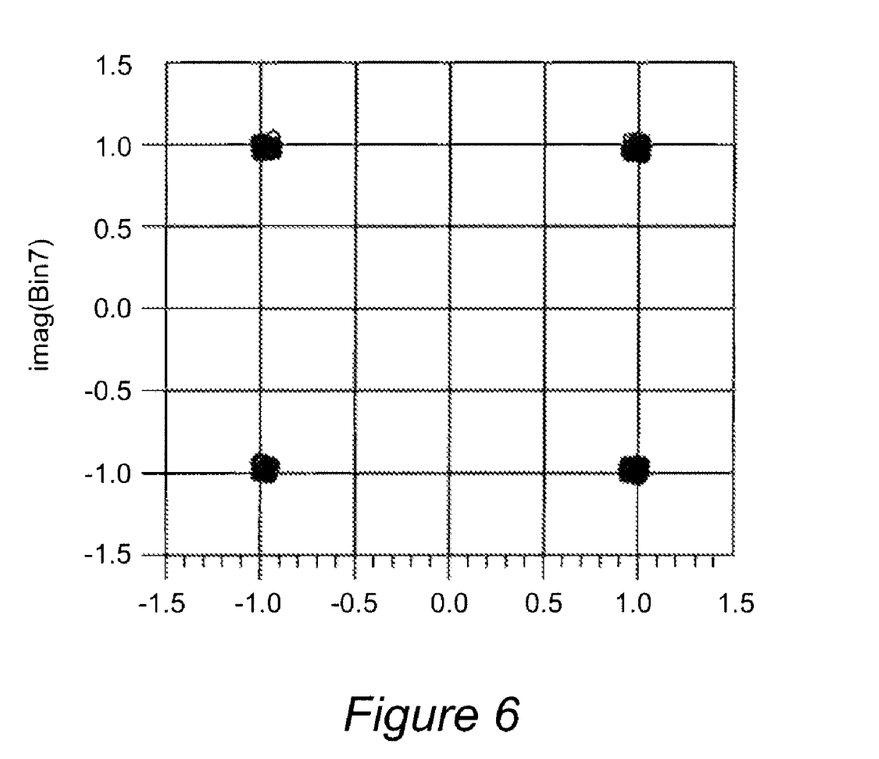
FIG. 6 shows an example simulation result of one example QPSK constellation.

FIG. 5 shows a block diagram of the simulation model employed by the present inventors. An eight point FFT implementation of the FIG. 4 example AMS FFT 100 was used for the simulation. Referring to FIG. 5, the simulation was performed in two simulator domains; Ptolemy and Transient. To excite the transient circuit, a synthesized one GigaSample/second pseudo-random bit stream was modulated to synthesize a quadrature OFDM signal, using Agilent™ ADS Ptolemy™ logic elements. The synthesized modulated data was passed to the transient simulator shown in FIG. 5, and eight returned QPSK streams were compared against an ideal mathematical eight-point FFT. The difference was used to form an error vector magnitude (EVM), to quantify the distortion contributed by the modeled analog multiplier based eight discrete point Fourier transform circuit according to the present invention. EVM is a root mean square (RMS) of the difference. The EVM measurement is used in the related art as a measuring of error in conventional FFT-based OFDM receivers. As known in the OFDM receiver arts, a conventional digital FFT-based OFDM receiver does not provide zero EVM. Error is introduced by, for example, sample jitter of the high speed flash ADCs, and by arithmetic round-off in the digital FFT processor. For many existing OFDM receiver systems, an EVM of three percent is currently acceptable. The simulation showed an EVM, for the modeled OFDM with an analog multiplier based Fourier transform circuit according to the FIG. 3 example 8-point AMS FFT 100, of approximately 2.5 percent. FIG. 6 shows a QPSK simulation result, based on the modeled OFDM, having an analog multiplier based Fourier transform circuit according to the FIG. 3 example 8-point AMS FFT 100.

While certain embodiments and features of the invention have been illustrated and described herein, many modifications, substitutions, changes, and equivalents will occur to those of ordinary skill in the art. It is therefore to be understood that the appended claims are intended to cover all such modifications and changes as fall within the spirit of the invention.

We hereby claim:

1. An analog multiplier based I-Q channelizing filter, comprising:
   a bank of sample-and-hold (S/H) circuits, constructed and arranged to each receive an externally generated input signal, sample and hold N consecutive analog sample pairs, N>3, of the input signal, each sample pair being a sample of an in-phase baseband signal IS and a sample of a quadrature baseband signal QS, and concurrently output the N consecutive analog samples as N held analog sample pairs;
   a clock circuit generating a master clock ck and N phase-shifted divide-by-N clocks ck1, ck2, . . . , ckN, the clocks ck1, ck2, . . . , ckN being applied to and controlling a corresponding one of said bank of S/H circuits; and
   an analog-multiplier based Fourier Transform circuit, constructed and arranged to receive said N held analog samples and output a corresponding N analog transform signals representing an N-point discrete Fourier transform of said N held analog samples, wherein said Fourier Transform circuit includes a plurality of analog multipliers and analog summers.

2. The filter of claim 1, wherein said analog-multiplier based Fourier Transform circuit comprises a plurality of analog butterfly circuits, at least one of said analog butterfly circuits having R input terminal pairs and R output terminal pairs, an analog summer and an analog multiplier arranged between said R input terminal pairs and R output terminal pairs, and
   wherein said analog butterfly circuit is constructed and arranged to provide a steady-state transfer function representing a radix R butterfly between the R input terminal pairs and the R output terminal pairs.

3. The filter of claim 2, wherein R is equal to two, such that said butterfly circuit is constructed and arranged to provide a steady-state transfer function representing a radix-2 butterfly between two of said input terminal pairs and two of said output terminal pairs.

4. The filter of claim 3, wherein each S/H circuit of said bank of S/H circuits is constructed as a pair of S/H circuits and arranged to respectively receive an externally generated input signal having an in-phase signal IS and a quadrature signal QS, and to sample and hold N consecutive analog samples of the input in-phase signal IS and quadrature signal QS, and output said N consecutive analog samples as N sample pairs, each pair having an in-phase sample and a quadrature sample.

5. The filter of claim 4, wherein at least one of said analog multipliers includes a phase rotation circuit to receiving a signal having an in-phase component signal and a quadrature component signal, having respective magnitudes and polarities representing an input I-Q magnitude and phase angle, and to output a phase rotated signal having an in-phase component signal and a quadrature component signal, having respective magnitudes and polarities representing an output I-Q magnitude and phase angle related to said an input I-Q magnitude and phase angle by a predetermined phase rotation.

6. The filter of claim 2, wherein each S/H circuit of said bank of S/H circuits is constructed as a pair of S/H circuits and arranged respectively to receive an externally generated input signal having an in-phase signal IS and a quadrature signal QS, and to sample and hold N consecutive analog samples of the input in-phase signal IS and quadrature signal QS signal, and output said N consecutive analog samples as N sample pairs, each pair having an in-phase sample and a quadrature sample.

7. The filter of claim 6, wherein said analog multiplier includes a phase rotation circuit to receiving a signal having an in-phase component signal and a quadrature component signal, having respective magnitudes and polarities representing an input I-Q magnitude and phase angle, and to output a phase rotated signal having an in-phase component signal and a quadrature component signal, having respective magnitudes and polarities representing an output I-Q magnitude and phase angle related to said an input I-Q magnitude and phase angle by a predetermined phase rotation.

8. An Orthogonal Frequency Division Multiplex (OFDM) receiver, comprising:
   an RF I-Q receiver constructed and arranged to receive an externally generated signal band, downconvert the received externally generated signal band to an in-phase baseband signal IS and a quadrature baseband signal QS;
   a first sample-and-hold (S/H) circuit including a pair of S/H circuits, one receiving the in-phase baseband signal IS and one receiving the quadrature baseband signal QS;
   an analog multiplier based I-Q channelizing filter, comprising:
   a bank of S/H circuits, constructed and arranged to sample and hold N consecutive analog sample pairs from said first S/H circuit, N>3, each sample pair being a sample of the in-phase baseband signal IS and a sample of the quadrature baseband signal QS, and concurrently output the N consecutive analog sample pairs as N held analog sample pairs,
   a clock circuit generating a master clock ck and N phase-shifted, divide-by-N clocks ck1, ck2, . . . , ckN, the master clock ck being applied to and controlling said first S/H circuit and the clocks ck1, ck2, . . . , ckN being applied to and controlling a corresponding one of said hank of S/H circuits; and
   an analog-multiplier based Fourier Transform circuit, having N inputs, N outputs, and a plurality of analog multipliers and analog summers connected between said N inputs and N outputs, constructed and arranged to receive said N held analog sample pairs on said N inputs, and output on said N outputs corresponding N analog transform signals, representing an N-point discrete Fourier transform of said N held analog samples, each of said N analog transform signals having an in-phase component signal and a quadrature component signal having respective magnitudes and polarities representing an I-Q phase and magnitude; and
   a bank of Binary Phase Shift Keying (BPSK) comparator/decoders connected to receive corresponding ones of said N analog transform signals and which output N bit streams as binary data, based on said I-Q phase and magnitude.

9. The OFDM receiver of claim 8, wherein said analog-multiplier based Fourier Transform circuit comprises a plurality of analog butterfly circuits, said analog butterfly circuits having R input terminal pairs and R output terminal pairs, an analog summer and an analog multiplier arranged between said R input terminal pairs and R output terminal pairs, and wherein said analog butterfly circuit is constructed and arranged to provide a steady-state transfer function representing a radix R butterfly between the R input terminal pairs and the R output terminal pairs.

10. The OFDM receiver of claim 9, wherein said analog-multiplier based Fourier Transform circuit comprises an 8-point radix-2 Fourier Transform multiplier is formed of a lattice of twelve radix-2 analog multiplier based N-point (AMS) Fast Fourier Transform (FFT) butterfly circuits, arranged in a three-stage pipeline, with four butterfly circuits to each stage, each radix-2 AMS butterfly circuit comprising two analog I-Q multipliers and analog I-Q summers, each of the analog I-Q summers receives two I-Q analog input signals, an in-phase signal and a quadrature signal, and outputs an I-Q analog output having an in-phase component equal to the sum of the respective in-phase components of the inputs, and a quadrature component equal to the sum of the respective quadrature components of the inputs, each of the in-phase and quadrature signals has a magnitude and a polarity, positive or negative, upon which the summations are generated.

11. The OFDM receiver of claim 9, wherein R is equal to two, such that each of said butterfly circuits is constructed and arranged to provide a steady-state transfer function representing a radix-2 butterfly between two of said input terminal pairs and two of said output terminal pairs.

12. The OFDM receiver of claim 11, wherein at least one of said analog multipliers includes a phase rotation circuit to receiving a signal having an in-phase component signal and a quadrature component signal, having respective magnitudes and polarities representing an input I-Q magnitude and phase angle, and to output a phase rotated signal having an in-phase component signal and a quadrature component signal, having respective magnitudes and polarities representing an output I-Q magnitude and phase angle related to said input I-Q magnitude and phase angle by a predetermined phase rotation.

* * * * *